(12) United States Patent
Fanning et al.

(10) Patent No.: US 12,430,462 B2
(45) Date of Patent: Sep. 30, 2025

(54) TELEMETRY SAMPLING SCANNING FOR EXPOSED SECRETS AND OTHER SENSITIVE DATA

(71) Applicant: Microsoft Technology Licensing, LLC, Redmond, WA (US)

(72) Inventors: Michael Christopher Fanning, Redmond, WA (US); Eugene Wilson Hodges, IV, Holly Springs, NC (US); Jacek Andrzej Czerwonka, Sammamish, WA (US); Nicolas Yves Couraud, Westwood, MA (US); Christopher Michael Henry Faucon, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 70 days.

(21) Appl. No.: 18/383,811

(22) Filed: Oct. 25, 2023

(65) Prior Publication Data
US 2025/0139275 A1    May 1, 2025

(51) Int. Cl.
G06F 21/62    (2013.01)

(52) U.S. Cl.
CPC ...... G06F 21/6227 (2013.01); G06F 21/6245 (2013.01)

(58) Field of Classification Search
CPC .......... G06F 21/6227; G06F 21/6245
See application file for complete search history.

(56) References Cited

U.S. PATENT DOCUMENTS

| | | | |
|---|---|---|---|
| 9,734,343 B2 | 8/2017 | Galil et al. | |
| 11,363,039 B2 | 6/2022 | Kaidi | |
| 2020/0349256 A1* | 11/2020 | Murdoch | H04L 63/00 |
| 2021/0026982 A1* | 1/2021 | Amarendran | G06F 21/6254 |
| 2022/0382891 A1* | 12/2022 | Shmidov | G06N 5/04 |
| 2023/0063214 A1 | 3/2023 | Tischler et al. | |

FOREIGN PATENT DOCUMENTS

| | | |
|---|---|---|
| CN | 111639365 A | 9/2020 |
| CN | 111404890 B | 7/2022 |

OTHER PUBLICATIONS

International Search Report Received in PCT Application No. PCT/US2024/049689, mailed on Jan. 2, 2025, 14 pages.

* cited by examiner

Primary Examiner — Hee K Song
(74) Attorney, Agent, or Firm — WORKMAN NYDEGGER (57) ABSTRACT

Disclosed systems and methods identify a data record set and determine whether one or more predetermined conditions exist for triggering analysis of one or more records in the data record set. Disclosed embodiments trigger the analysis only in response to determining that the predetermined conditions have been met. Upon triggering the analysis of the data record set, disclosed embodiments identify a subset of the data record set to undergo the analysis while refraining from performing the analysis on the remaining records in the data record set. Further, embodiments identify an analysis model based on a level of analysis to be performed and apply the analysis model to the subset of the data record set to identify any presence of sensitive data. Lastly, disclosed embodiments selectively perform a security process to the data record set in response to detecting the presence of the sensitive data.

20 Claims, 4 Drawing Sheets

TELEMETRY SAMPLING SCANNING FOR EXPOSED SECRETS AND OTHER SENSITIVE DATA

CROSS-REFERENCE TO RELATED APPLICATIONS

N/A

BACKGROUND

Log telemetry includes comprehensive records of activities and interactions within a system. The log telemetry data regularly includes information related to authentication, network connections, and other sensitive data. As a result, log telemetry data affords a literal security risk by exposing sensitive information, such as credentials, to persons unauthorized to access the sensitive information. Additionally, telemetry data affords a legal risk by exposing, publishing, or copying classes of data that are outside of legal and regulatory compliance.

The subject matter claimed herein is not limited to embodiments that solve any disadvantages or that operate only in environments such as those described supra. Instead, this background is only provided to illustrate one example technology area where some embodiments described herein may be practiced.

SUMMARY

The techniques described herein relate to a computer implemented method for performing selective and dynamic sampling, including: identifying a data record set, wherein the data record set includes one or more data records; determining whether one or more predetermined conditions exist for triggering analysis of one or more records in the data record set; dynamically triggering the analysis of the one or more records in the data record set only in response to determining the one or more predetermined conditions have been met, while refraining from triggering the analysis of the one or more records in the data record set in response to determining the one or more predetermined conditions have not been met; and upon triggering the analysis of the data record set: identifying a subset of the data record set with selected one or more records to undergo the analysis and while refraining from performing the analysis on remaining one or more records in the data record set; identifying an analysis model based on a level of analysis to be performed on the subset of the data record set; applying the analysis model to the subset of the data record set to identify any presence of sensitive data; and selectively performing a security process to the data record set in response to detecting the presence of the sensitive data, while refraining from performing the security process to the data record set in response to failing to detect the presence of the sensitive data.

Disclosed embodiments also include or utilize a computer system, including: a processor system; and a computer storage medium that stores computer-executable instructions that are executable by the processor system to at least: identify a data record set, wherein the data record set includes one or more data records; determine whether one or more predetermined conditions exist for triggering analysis of one or more records in the data record set; trigger the analysis of the one or more records in the data record set only in response to determining the one or more predetermined conditions have been met, while refraining from triggering the analysis of the one or more records in the data record set in response to determining the one or more predetermined conditions have not been met; and upon triggering the analysis of the data record set: identify a subset of the data record set with selected one or more records to undergo the analysis and while refraining from performing the analysis on remaining one or more records in the data record set; identify an analysis model based on a level of analysis to be performed on the subset of the data record set; apply the analysis model to the subset of the data record set to identify any presence of sensitive data; and selectively perform a security process to the data record set in response to detecting the presence of the sensitive data, while refraining from performing the security process to the data record set in response to failing to detecting the presence of the sensitive data.

Disclosed embodiments also include a computer storage medium that stores computer-executable instructions that are executable by a processor system to create a schedule, the computer-executable instructions including instructions that are executable by the processor system to at least: identify a data record set, wherein the data record set includes one or more data records; determine whether one or more predetermined conditions exist for triggering analysis of one or more records in the data record set; trigger the analysis of the one or more records in the data record set only in response to determining the one or more predetermined conditions have been met, while refraining from triggering the analysis of the one or more records in the data record set in response to determining the one or more predetermined conditions have not been met; and upon triggering the analysis of the data record set: identify a subset of the data record set with selected one or more records to undergo the analysis and while refraining from performing the analysis on remaining one or more records in the data record set; identify an analysis model based on a level of analysis to be performed on the subset of the data record set; apply the analysis model to the subset of the data record set to identify any presence of sensitive data; and selectively perform a security process to the data record set in response to detecting the presence of the sensitive data, while refraining from performing the security process to the data record set in response to failing to detecting the presence of the sensitive data.

This Summary introduces a selection of concepts in a simplified form that are further described below in the Detailed Description. This Summary is not intended to identify key features or essential features of the claimed subject matter, nor is it intended to be used to determine the scope of the claimed subject matter.

BRIEF DESCRIPTION OF THE DRAWINGS

To describe how the advantages of the systems and methods described herein can be obtained, a more particular description of the embodiments briefly described supra is rendered by reference to specific embodiments thereof, which are illustrated in the appended drawings. These drawings depict only typical embodiments of the systems and methods described herein and are not, therefore, to be considered to be limiting in their scope. Systems and methods are described and explained with additional specificity and detail through the use of the accompanying drawings, in which.

DETAILED DESCRIPTION

Log telemetry data comprises a comprehensive record of activities and interactions within a system. Often, this data includes sensitive information that results in security and legal risks. Traditionally, the risk of exposing sensitive information is addressed by securing the data (e.g., encrypting the data) to prevent unauthorized access or misuse. Alternatively, strict access controls to the data may be implemented or the data may be purged regularly to avoid exposure of the sensitive information.

While conventional telemetry management techniques can be used to reduce the amount of sensitive data that is exposed, purging the data impedes troubleshooting and repairs of the computing system. Even further, once a data owner is aware the data contains sensitive information, it is difficult, and near impossible, to systematically discover and eliminate all sources of exposure. Some problems include, for example, the expensive cost of scanning large data sets for sensitive information, logging duplicative telemetry data, and scanning irrelevant or unimportant portions of a telemetry record. Therefore, there is an ongoing need to reduce exposure to sensitive data found in log telemetry data.

At least some embodiments described herein are directed to selective and dynamic sampling of data records during the data generation phase to perform high-confidence detection of sensitive data. For example, as a producer generates data records stored in a data record set, a system may identify the data record set. When predetermined conditions are met, an analysis is triggered on one or more data records in the data record set. Embodiments identify a subset of data records in the data record set to undergo analysis and an analysis model based on a level of analysis to be performed on the subset of the data record set. The identified analysis model is applied to the subset of the data record set to identify any presence of sensitive information. When sensitive information is detected, a security process is selectively performed on the data record set.

By selectively and dynamically analyzing data record sets, disclosed embodiments detect sensitive information without performing a full scan of the log telemetry data or redacting essential data for debugging purposes. This reduction in the total scanning of the entire telemetry corpus is one technical benefit of the disclosed embodiments. Additional technical benefits include the flexibility to apply different levels of analysis based on detected patterns in the data record set which dynamically may take into account business factors such as resource availability and computational costs. Additionally, the technical benefits further include the ability to selectively perform security processes on only the data records that have been determined to contain sensitive data. The security processes may be specific to the contents of the data record, follow regulatory guidelines, or be based on specific business protocols.

Figure 1:
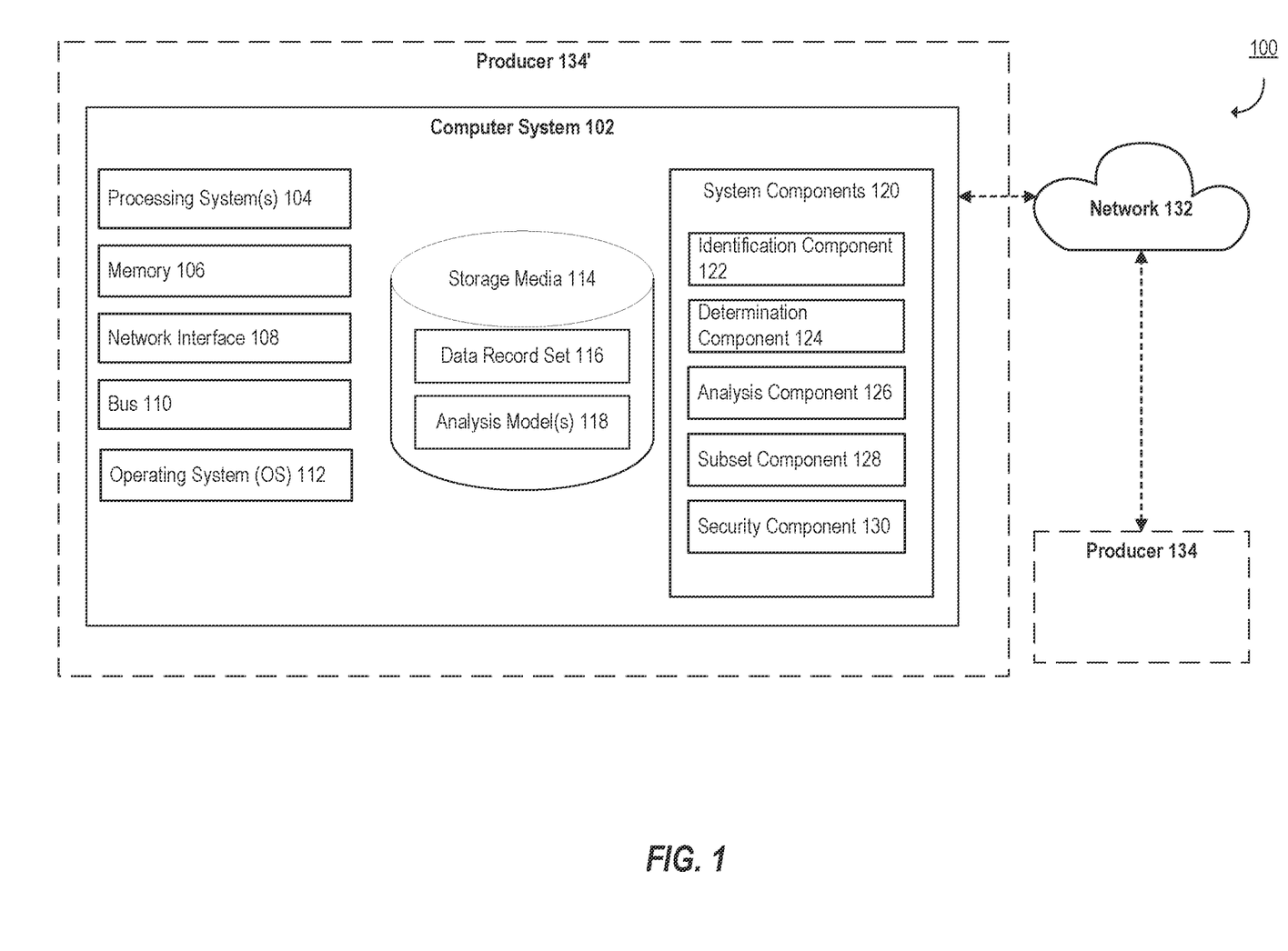
FIG. 1 illustrates an example of a computer architecture that facilitates selective and dynamic sampling.

FIG. 1 illustrates an example of computer architecture 100 that facilitates selective and dynamic sampling of data records, such as log telemetry data. As shown, computer architecture 100 includes a computer system 102 comprising processor system 104 (e.g., a single processor or a plurality of processors), memory 106 (e.g., system or main memory), storage media 114 (e.g., a single computer-readable storage medium, or a plurality of computer-readable storage media), system components 120, all interconnected by a bus 110. As shown, computer system 102 may also include a network interface 108 (e.g., one or more network interface cards) for interconnecting (via a network 132) to a producer 134.

The storage media 114 is illustrated as storing a data record set 116. In some embodiments, the data record set 116 includes one or more data records created by the producer 134. Producer 134 receives data records and synthesizes the data records into a data record set. In some embodiments, the producer 134 is a separate system and interconnects to the computer system 102 via the network 132 to send the data record set 116 from the producer 134 to the computer system 102. In other embodiments, the producer 134' is located at the computer system 102. In this instance, the computer system 102 receives the data records and stores the data records as a data record set 116 in the storage media 114. In some embodiments, the data records may be created by more than one producer 134 (e.g., two producers, three producers, or more than three producers, even though such producer(s) are only represented as a single producer 134 in FIG. 1).

As also shown in FIG. 1, the storage media 114 is illustrated as storing a set of one or more analysis model(s) 118. In some embodiments, the set of one or more analysis model(s) 118 include static analysis tools that apply string parsing, regular expression pattern matching, or semantic detection of specific data patterns. Additionally, the set of one or more analysis model(s) 118 further include dynamic analysis models, machine learning models, neural network models, and artificial intelligence (AI) models.

Figure 3:
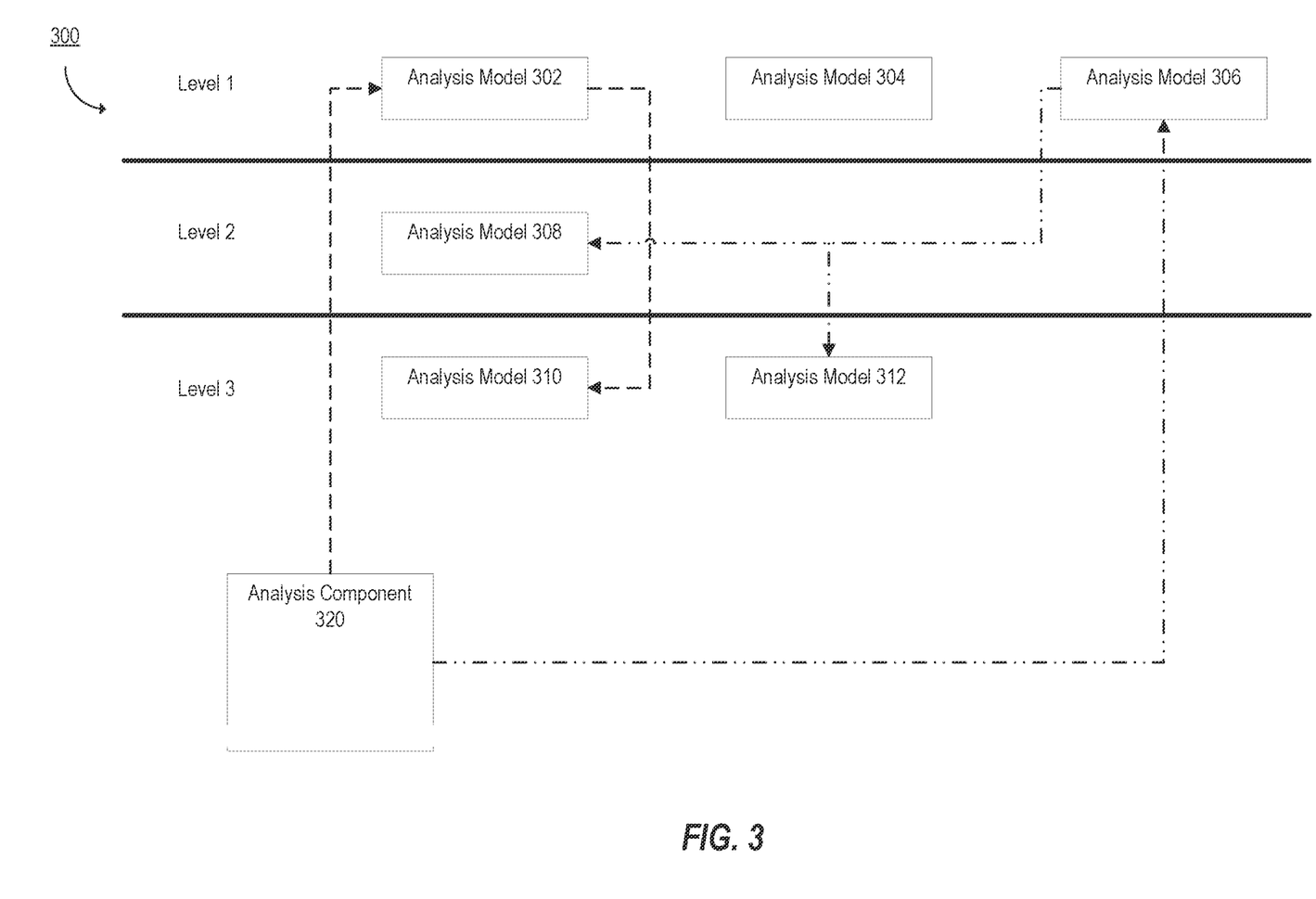
FIG. 3 illustrates an example of an analysis model hierarchy.

In some embodiments, the set of one or more analysis model(s) 118 are ranked into tiers or levels based on types of analysis performed by the analysis model(s) 118, as shown in FIG. 3.

In some embodiments, an initial analysis of the data record set includes a lightweight detection by a preliminary analysis model 118 (e.g., a regular expression pattern matching model). Based on the results of the initial analysis, embodiments may perform a more substantive analysis using a different analysis model included in the set of one or more analysis models 118 (e.g., a machine learning model).

System components 120 is illustrated as storing computer-executable instructions implementing at least a selective and dynamic sampling method. In some embodiments, the system components 120 includes an identification component 122, a determination component 124, an analysis component 126, a subset component 128, and a security component 130. Each component will now be discussed in more detail.

In some embodiments, the computer system 102 receives the data record set 116 from the producer 134 and stores the data record set 116 in the storage media 114. The identification component 122 identifies when the data record set 116 has been received and stored in the storage media 114. In some embodiments, the identification component 122 identifies when the data record set 116 is complete (e.g., no longer receiving data records).

In other embodiments, the identification component 122 identifies when the first data record is received even while more data records are being received by the producer 134 and being added to the data record set 116. In these embodiments, the identification component 122 identifies the data record set 116 inline, or while the data record set 116 is being created.

Once a data record set 116 is identified by the identification component 122, the determination component 124 determines whether predetermined conditions exist. In some embodiments, the predetermined conditions include a runtime evaluated condition such as a specified random sampling of the data records in the data record set.

In other embodiments, the predetermined conditions include configurations of the computer system 102 or configurations of the producer 134. In yet other embodiments, the predetermined conditions include policies associated with the computer system 102, policies associated with the producer 134, user input conditions, or other appropriate conditions. The determination component 124 may determine whether one predetermined condition exists or whether more than one predetermined condition exists. Once one or more predetermined conditions are determined to exist by the determination component 122, an analysis is triggered for one or more data records in the data record set 116.

In some embodiments, the analysis component 126 triggers an analysis of the data record set 116. In some embodiments, the analysis component 126 is only triggered in response to determining whether one or more of the predetermined conditions have been met by the determination component 124. In these embodiments, when the determination component 124 determines that one or more predetermined conditions have not been met, the computer system 102 refrains from triggering the analysis component 126.

In the case that the analysis component 126 is triggered, upon triggering the analysis of the data record set 116 by the analysis component 126, the subset component 128 identifies a subset of the data record set 116 to undergo the analysis while refraining from performing the analysis on the rest of the data record set 116. More particularly, the subset of the data record set 116 includes some selected data records in the data Accordingly, in some embodiments, the subset of the data record set is less than all of the data records in the data record set.

In other embodiments, the subset of the data record set includes all of the data records in the data record set. In some embodiments, the identified subset of the data record set that includes the selected one or more records by the subset component 128 undergoes the analysis by the analysis component 126. The analysis component 126 further refrains from performing the analysis on the remaining unselected one or more records in the data record set.

In some embodiments, the subset component 128 selects the subset of data records in the data record set using a random sampler until a pre-defined percentage of samples is selected (e.g., 5%, 10%, 20%, or more than 20%). In other embodiments, the subset component 128 selects the subset of data records based on identifying a pattern in the data records in the data record set and selecting the data records that exhibit the pattern. In yet other embodiments, the subset component 128 may select the subset of data records in the data record set using a pattern (e.g., every tenth, every fourth, every fifth or another number of data records). In some embodiments, the subset component 128 selects only a portion of each data record in the data record set. For example, the subset component 128 may select one or more particular columns, rows or fields of data in each data record that match predetermined criteria (e.g., having a particular type of data) in the data record set.

In other embodiments, the subset component 128 is dynamically optimized and uses any combination of strategies to select the subset of data records in the data record set based on a machine learning model, user input, or a predetermined method. Additionally, in some embodiments, the subset component 128 may undergo an iterative process of selecting the subset of data records in the data record set. For example, the subset component 128 may initially select 50% of the data records in the data record set and subsequently select the third column in each of the selected data records to create a second subset.

The analysis component 126 further identifies an analysis model based on a level analysis to be performed on the subset of the data record set. In some embodiments, the analysis component 126 identifies a single analysis model 118. In other embodiments, the analysis component 126 may identify more than one analysis model 118 to be applied to the subset of the data record set. As mentioned above, embodiments may sort the analysis models 118 based on a level of analysis from a lightweight or preliminary analysis to a more substantive analysis.

In some embodiments, the analysis model 118 may be identified by the analysis component 126 based on a data schema of the data record set 116. The data schema of the data record set 116 may be determined by the identification component 122 when the data record set 116 is identified or may be pre-specified by the data record set 116.

There are different types of analysis models that can be applied and that correspond to different predetermined conditions detected by the determination component 124. For example, a first predetermined condition (e.g., a determination that a record will be transmitted for publication) may be associated with a first analysis model (e.g., a model trained to identify certain phrases and terms that are determined to be inflammatory or racist). Other predetermined conditions (e.g., a determination that a certain user is emailing content outside of an enterprise) may trigger an analysis with a different analysis model that is trained to identify confidential information. Yet another predetermined condition (e.g., detecting a document is being loaded into a share folder) can trigger analysis with another analysis model that is trained to determine context for certain terms that could be viewed as dangerous or operationally appropriate for different contexts (e.g., the term terminate or kill).

Embodiments then apply the analysis model 118 to the subset of the data record set. In some embodiments, the analysis model 118 uses the subset of the data record set as input and identifies the presence of any sensitive data in the subset of the data record set. In some embodiments, the sensitive data may include user-identifiable information (e.g., name, birthday, social security number), regulated information (e.g., health information), or proprietary information (e.g., source code). In other embodiments, the sensitive data may include terms that are viewed as inflammatory, dangerous, or hate speech.

In some embodiments, the sensitive information is statically defined in the analysis model 118. In other embodiments, the sensitive information is dynamically defined and is periodically updated in the analysis model 118. In these embodiments, the detection of sensitive data can be tuned based on the analysis model 118, detected patterns, user input, or other factors. In yet other embodiments, the analysis model 118 recognizes patterns and flags the data to determine whether the data contains sensitive information.

In response to the analysis model 118 detecting the presence of the sensitive data, the security component 130 selectively performs a security process to the data record set 116. In response to the analysis model 118 failing to detect the presence of sensitive data, the security component 130 refrains from performing a security process to the data record set 116.

In some embodiments, the security process includes sending a notification to the user that sensitive data was detected in the data record set 116. In other embodiments, the security process includes halting the production of the data record set 116 by the producer 134.

In some embodiments, the security process includes performing a second analysis on the data record set 116 such as a more complete and/or a full scan of the data record set 116, or using a different or higher-level analysis model on the subset of the data record set that is trained to analyze the same sensitive data that is detected for different contexts or that is configured to examine the data record set 116 for different types of sensitive data.

In some embodiments, the security process includes redacting, replacing or encrypting the detected sensitive information identified in the data record set.

Additionally, or alternatively, rather than modifying or redacting the sensitive information, the security process may simply involve flagging the information within the record or flagging the record as potentially containing sensitive information for subsequent analysis.

Additionally, in response to analysis model 118 failing to detect the presence of the sensitive data, the security component 130 selectively refrains from performing the referenced security process. Instead, the system may alter that amount of scanning performed on subsequently processed data records, such as by scanning a smaller percentage of records or portions of the records and/or by applying a different and lower-level analysis model.

Figure 2:
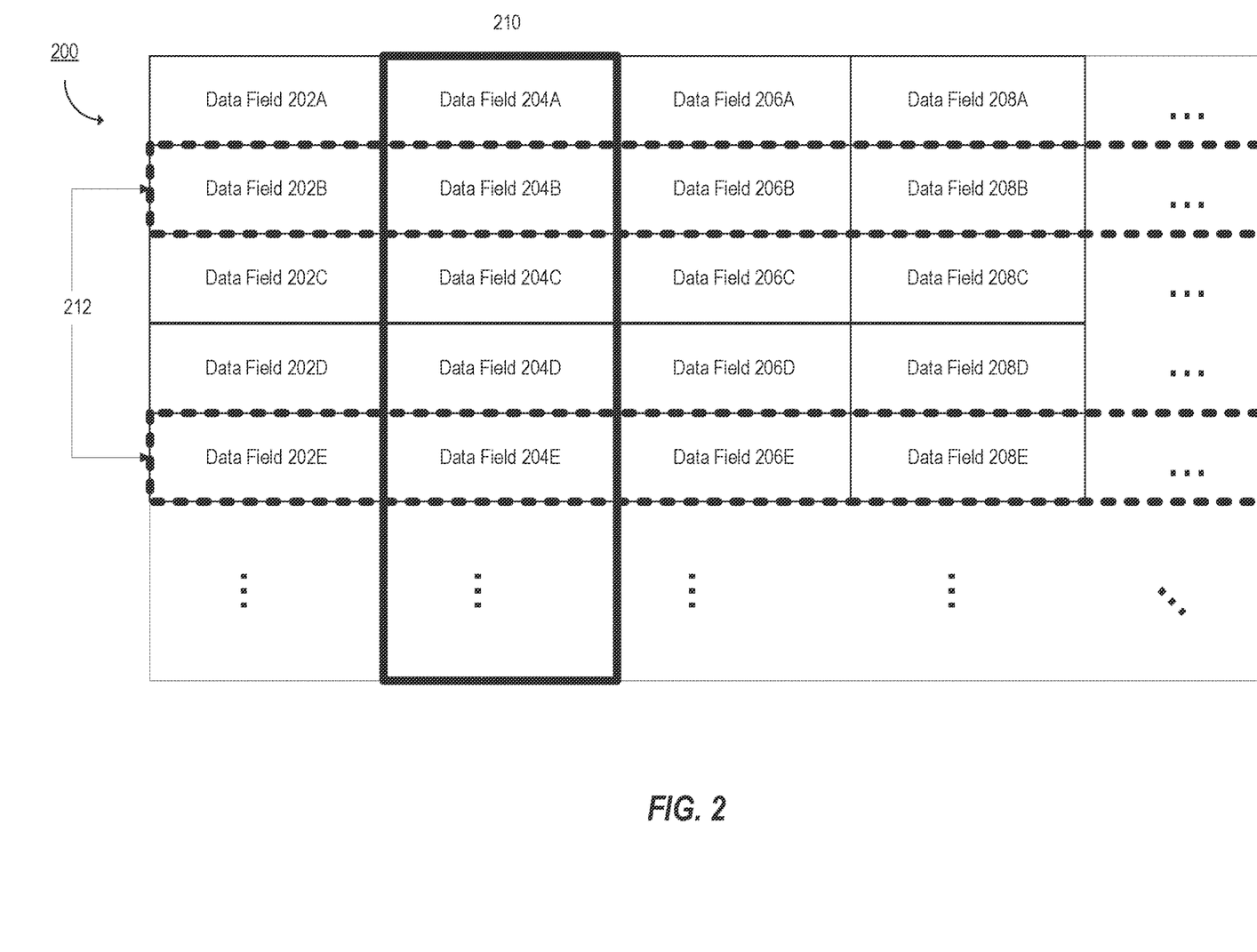
FIG. 2 illustrates an example of a data record set.

FIG. 2 illustrates an example 200 of the data record set 116 of FIG. 1. As shown, each row is a single data record created by a producer 134 with multiple data fields. For example, 202-208A is a first data record, 202-208B is a second data record, 202-208C is a third data record, 202-208D is a fourth data record, and 202-208E is a fifth data record in the data record set. In some embodiments, the number of data records in the data record set is 1 or more records (e.g., 1, 2, 3, 4, 5, more than 5, 10, more than 10, 100, or more than 100). In some embodiments, each data record may contain one or more data fields (e.g., 1, 2, 3, 4, 5, more than 5, 10, more than 10, 100, or more than 100).

In some embodiments, the analysis of the data record set 116 may begin while more data records are being added to the data record set. In other embodiments, the analysis of the data record set 116 may not begin until no more data records are being added to the data record set.

As shown in FIG. 2, each column may comprise data fields that contain a similar type of data content. For example, data field 202A-202E may include a customer's name, data field 204A-204E may include user-inputted text, data field 206A-206E may include a time stamp, and data field 208A-208E may include an IP address.

In some embodiments, once the analysis has been triggered as described above, the subset component 128 identifies a subset of data. Following the example above, the subset component 128 may identify data field 204 due to the fact data field 204 is a user-input text field. In some embodiments, a user may have typed their social security number in data field 204B, for example, and the subset component 128 may select the entire 204 column to undergo analysis as subset 210. In other embodiments, the subset component 128 may identify data record B and data record E as subset 212. In this example, data field 204B and data field 204E may include a social security number. In yet another example, the subset component 128 may select data record B and data record E as subset 212 using a random sampling technique where 40% of the data records are selected. In yet other embodiments, the subset component 128 may first select subset 210 and then subsequently select subset 212 to undergo analysis.

FIG. 3 illustrates an example 300 of an analysis model hierarchy. As shown, the analysis models 118 have been organized into three levels. In some embodiments, the analysis models may be organized into less than three, three, or more than three levels. As illustrated in FIG. 3, analysis model 302, analysis model 304, and analysis model 306 are in level 1, analysis model 308 is in level 2, and analysis model 310 and analysis model 312 are in level 3. In other embodiments, each level may contain one analysis model, two analysis models, three analysis models, or more than three analysis models. Additionally, in some embodiments, the organization of the analysis models may be dynamically changed based on training, user input, or other factors. In some embodiments, the computer system 102 may update and dynamically change the analysis models 118 periodically to include new analysis models or remove old analysis models.

In some embodiments, the analysis component 320 identifies an analysis model 302 based on a level of analysis to be performed on the subset of the data record set 212. For example, the analysis component 320 initially identifies a level 1 analysis model 302. In the instance where analysis model 302 identifies sensitive data in the subset of the data record set 212, the security component 130 selectively may perform a security process which includes performing a subsequent analysis on the subset of the data record set 212 or the entire data record set 200. In some embodiments, the analysis component 320 may subsequently select a level 3 analysis model 310. In some embodiments, the analysis component 320 may skip levels of analysis (e.g., skip level 2 analysis model 308 and applying analysis model 310 in response to detecting sensitive data during analysis with analysis model 302).

In some embodiments, the analysis component 320 identifies more than one analysis model. For example, in some embodiments, the analysis component 320 identifies level 1 analysis model 306. In response to analysis model, 306 detecting sensitive information in the subset of the data record set 212, the analysis component 320 may subsequently identify level 2 analysis model 308 and level 3 analysis model 312. In some embodiments, the analysis component 320 may perform analysis of the subset of the data record set 212 using analysis model 308 and analysis model 312 in parallel. In other embodiments, the analysis component 320 may perform analysis of the subset of the data record set 212 using analysis model 308 and subsequently using analysis model 312 and then send detected sensitive information from both analysis models to the security component 130.

In yet other embodiments, the analysis component 320 may perform analysis using multiple analysis models (e.g., analysis model 306 analysis model 308, and analysis model 312) before sending identified sensitive information from all analysis models to the security component 130. In other embodiments, the analysis component 320 may use only analysis model 302 and then send the identified sensitive data to the security component 130. The security component 130 may then, in some embodiments, trigger the analysis component 320 to use analysis model 310 and send additional identified sensitive information to the security component 130.

Embodiments are now described in connection with FIG. 4, which illustrates a flow chart of an example method 400 for selectively and dynamically sampling data record sets. In some embodiments, instructions for implementing method 400 are encoded as computer-executable instructions (e.g., identification component 12, determination component 124, analysis component 126, subset component 128, and security component 130) stored on a computer storage media (e.g., system components 120) that are executable by a processor (e.g., processor 104) to cause a computer system (e.g., computer system 102) to perform the method.

The following discussion now refers to a method and method acts. Although the method acts are discussed in specific orders or are illustrated in a flow chart as occurring in a particular order, no order is required unless expressly stated or required because an act is dependent on another act being completed before the act is performed.

Figure 4:
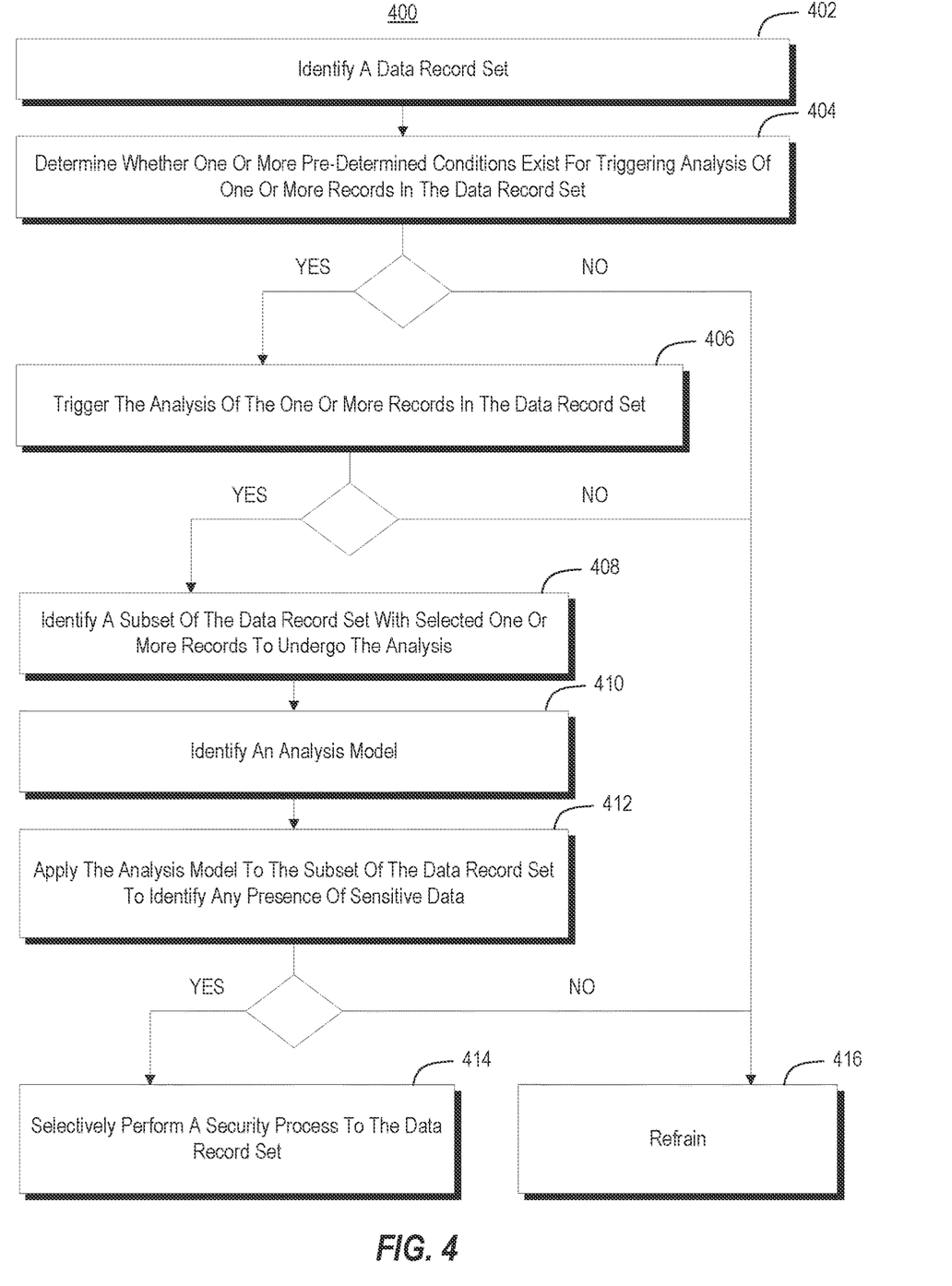
FIG. 4 illustrates a flow chart of an exemplary method for selective and dynamic sampling.

Referring to FIG. 4, method 400 illustrates an embodiment in which a computer system 102 identifies a data record 116 by an identification component 122. The data record set 116 may include one or more data records. In some embodiments, act 400 comprises act 402 of identifying a data record set, wherein the data record set comprises one or more data records.

Method 400 also includes act 404 of determining whether one or more predetermined conditions exist for triggering analysis of one or more records in the data record set 116 by the determination component 124. In some embodiments, the predetermined conditions include runtime-evaluated conditions, configuration information of the computer system 102 or the producer 134, user-specified conditions, or a combination of conditions.

In response to the predetermined conditions not being met by the determination component 124, the system implements act 416 and refrains from triggering the analysis of the one or more records in the data record set.

In response to the predetermined conditions being met by the determination component 124 (e.g., a particular time of day, a particular use of the computer system 102, a particular action taken with the computer system such as the transmission of a record or certain quantity of data), the system continues to act 406. Act 406 comprises triggering the analysis of the one or more records in the data record set, but only in response to determining that one or more predetermined conditions have been met. For example, when the one or more predetermined conditions have not been met, the analysis component 126 is refrained from being triggered and method 400 implements act 416 to refrain from triggering the analysis.

In response to the analysis component 126 being triggered, method 400 continues to act 408. Act 408 comprises identifying a subset of the data record set with the selected one or more records to undergo the analysis by the analysis component 126. Additionally, act 408 refrains from performing the analysis on remaining one or more records in the data record set. For example, the subset component 128 may identify one or more records to be selected in the data record set 116 to form a subset of the data record set 212. The subset component 128 may identify the subset of the data record set 212 using a random sampler, a pattern recognition, or other appropriate methods. Additionally, the subset component 130 may identify more than one subset of the data record set (e.g., subset 212 and subset 210) to undergo analysis.

Method 400 also comprises act 410 of identifying an analysis model based on a level of analysis to be performed on the subset of the data record set by the analysis component 320. For example, analysis component 320 may select a level 1 analysis model 302 based on an initial preliminary analysis on the subset of the data record set 212 and the type of predetermined conditions that are determined to exist.

Method 400 also comprises act 412 of applying the analysis model to the subset of the data record set to identify any presence of sensitive data. In some embodiments, the analysis model identified by the analysis component 320 (e.g., analysis model 320) may be trained to detect predefined terms, numbers, or other patterns in the subset of the data record set 212 to identify sensitive data.

In the case where the analysis model fails to identify sensitive data in the subset of the data record set, method 400 implements act 416 and refrains from performing a security process to the data record set in response to failing to detect the presence of the sensitive data.

In the case where the analysis model identifies sensitive data, method 400 implements act 414 of selectively performing a security process, by the security component 130, to the data record set in response to detecting the presence of the sensitive data. In some embodiments, the security component 130 performs a security process that includes sending a notification to the user. In other embodiments, the security component 130 performs a security process that includes a second analysis of the subset of the data record set 212 or the data record set 116. In these embodiments, the second analysis may include a full scan of the data record set 116 or using a higher level data analysis model (e.g., analysis model 312). In other embodiments, the security component 130 performs a security process that includes redacting or encrypting the sensitive information.

Embodiments of the disclosure comprise or utilize a special-purpose or general-purpose computer system (e.g., computer system 102) that includes computer hardware, such as for example, a processor system (e.g., processor system 104) and system memory (e.g., memory 106), as discussed in greater detail below. Embodiments within the scope of the present disclosure also include physical and other computer-readable media for carrying or storing computer-executable instructions and/or data structures. Such computer-readable media can be any available media accessible by a general-purpose or special-purpose computer system. Computer-readable media that store computer-executable instructions and/or data structures are computer storage media (e.g., storage media 114). Computer-readable media that carry computer-executable instructions and/or data structures are transmission media. Thus, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EEPROM), solid state drives (SSDs), flash memory, phase-change memory (PCM), optical disk storage, magnetic disk storage or other magnetic storage devices, or any other hardware storage device(s) which store program code in the form of computer-executable instructions or data structures, which can be accessed and executed by a general-purpose or special-purpose computer system to implement the disclosed functionality.

Transmission media include a network and/or data links that carry program code in the form of computer-executable instructions or data structures that are accessible by a general-purpose or special-purpose computer system. A "network" is defined as a data link that enables the transport of electronic data between computer systems and other electronic devices. When information is transferred or provided over a network or another communications connection (either hardwired, wireless, or a combination thereof) to a computer system, the computer system may view the connection as transmission media. The scope of computer-readable media includes combinations thereof.

Upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface 108) and eventually transferred to computer system RAM and/or less volatile computer storage media at a computer system. Thus, computer storage media can be included in computer system components that also utilize transmission media.

Computer-executable instructions comprise, for example, instructions and data which when executed at a processor system, cause a general-purpose computer system, a special-purpose computer system, or a special-purpose processing device to perform a function or group of functions. In some embodiments, computer-executable instructions comprise binaries, intermediate format instructions (e.g., assembly language), or source code. In some embodiments, a processor system comprises one or more central processing units (CPUs), one or more graphics processing units (GPUs), one or more neural processing units (NPUs), and the like.

In some embodiments, the disclosed systems and methods are practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. In some embodiments, the disclosed systems and methods are practiced in distributed system environments where different computer systems, which are linked through a network (e.g., by hardwired data links, wireless data links, or by a combination of hardwired and wireless data links), both perform tasks. As such, in a distributed system environment, a computer system may include a plurality of constituent computer systems. Program modules may be located in local and remote memory storage devices in a distributed system environment.

In some embodiments, the disclosed systems and methods are practiced in a cloud computing environment. In some embodiments, cloud computing environments are distributed, although this is not required. When distributed, cloud computing environments may be distributed internally within an organization and/or have components possessed across multiple organizations. In this description and the following claims, "cloud computing" is a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as Software as a Service (SaaS), Platform as a Service (PaaS), Infrastructure as a Service (IaaS), etc. The cloud computing model may also be deployed using different deployment models such as private cloud, community cloud, public cloud, hybrid cloud, etc.

Although the subject matter has been described in language specific to structural features and/or methodological acts, it is to be understood that the subject matter defined in the appended claims is not necessarily limited to the described features or acts described supra or the order of the acts described supra. Rather, the described features and acts are disclosed as example forms of implementing the claims.

The present disclosure may be embodied in other specific forms without departing from its essential characteristics. The described embodiments are only as illustrative and not restrictive. All changes which come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A computer implemented method for performing selective and dynamic sampling, comprising:
   identifying a data record set, wherein the data record set comprises one or more data records;
   determining whether one or more predetermined conditions exist for triggering analysis of one or more records in the data record set;
   triggering the analysis of the one or more records in the data record set only in response to determining the one or more predetermined conditions have been met, while refraining from triggering the analysis of the one or more records in the data record set in response to determining the one or more predetermined conditions have not been met; and
   upon triggering the analysis of the data record set:
      identifying a subset of the data record set with selected one or more records to undergo the analysis and while refraining from performing the analysis on remaining one or more records in the data record set;
      identifying an analysis model based on a level of analysis to be performed on the subset of the data record set;
      applying the analysis model to the subset of the data record set to identify any presence of sensitive data; and
      selectively performing a security process to the data record set in response to detecting the presence of the sensitive data, while refraining from performing the security process to the data record set in response to failing to detect the presence of the sensitive data.

2. The method of claim 1, wherein the subset of the data record set contains a predetermined percentage of data records in the data record set.

3. The method of claim 1, wherein a random sampler is used to identify the subset of the data record set for analysis.

4. The method of claim 1, further comprising recognizing a pattern in a portion of data in the subset of the data record set.

5. The method of claim 4, further comprising performing a preliminary analysis on the portion of data.

6. The method of claim 1, further comprising determining a data schema of the data record set.

7. The method of claim 6, wherein identifying the analysis model is based on the data schema of the data record set.

8. The method of claim 1, wherein the security process is halting a production of the data record set.

9. The method of claim 1, wherein the security process is a notification sent to a user.

10. The method of claim 1, wherein the security process is a second analysis of the data record set.

11. The method of claim 10, wherein the second analysis is a full scan of the data record set.

12. The method of claim 10, wherein the second analysis uses a higher level data analysis model.

13. The method of claim 1, wherein the security process redacts the sensitive data.

14. The method of claim 1, wherein the security process encrypts the sensitive data.

15. The method of claim 1, further comprising tuning the detection of the sensitive data.

16. The method of claim 1, wherein the one or more predetermined conditions includes runtime-evaluated conditions.

17. The method of claim 1, wherein the one or more predetermined conditions includes configuration information.

18. The method of claim 1, wherein the one or more predetermined conditions include a set of user specified conditions.

19. A computer system, comprising:
a processor system; and
a computer storage medium that stores computer-executable instructions that are executable by the processor system to at least:
identify a data record set, wherein the data record set comprises one or more data records;
determine whether one or more predetermined conditions exist for triggering analysis of one or more records in the data record set;
trigger the analysis of the one or more records in the data record set only in response to determining the one or more predetermined conditions have been met, while refraining from triggering the analysis of the one or more records in the data record set in response to determining the one or more predetermined conditions have not been met; and
upon triggering the analysis of the data record set:
identify a subset of the data record set with selected one or more records to undergo the analysis and while refraining from performing the analysis on remaining one or more records in the data record set;
identify an analysis model based on a level of analysis to be performed on the subset of the data record set;
apply the analysis model to the subset of the data record set to identify any presence of sensitive data; and
selectively perform a security process to the data record set in response to detecting the presence of the sensitive data, while refraining from performing the security process to the data record set in response to failing to detect the presence of the sensitive data.

20. A computer storage medium that stores computer-executable instructions that are executable by a processor system, the computer-executable instructions including instructions that are executable by the processor system to at least:
identify a data record set, wherein the data record set comprises one or more data records;
determine whether one or more predetermined conditions exist for triggering analysis of one or more records in the data record set;
trigger the analysis of the one or more records in the data record set only in response to determining the one or more predetermined conditions have been met, while refraining from triggering the analysis of the one or more records in the data record set in response to determining the one or more predetermined conditions have not been met; and
upon triggering the analysis of the data record set:
identify a subset of the data record set with selected one or more records to undergo the analysis and while refraining from performing the analysis on remaining one or more records in the data record set;
identify an analysis model based on a level of analysis to be performed on the subset of the data record set;
apply the analysis model to the subset of the data record set to identify any presence of sensitive data; and
selectively perform a security process to the data record set in response to detecting the presence of the sensitive data, while refraining from performing the security process to the data record set in response to failing to detect the presence of the sensitive data.

* * * * *